United States Patent
Sugimura et al.

(10) Patent No.: US 6,847,781 B1
(45) Date of Patent: Jan. 25, 2005

(54) DIGITAL SIGNAL RECORDING APPARATUS AND RECORDING MEDIUM

(75) Inventors: Naozumi Sugimura, Yokohama (JP); Kyoichi Hosokawa, Yokohama (JP); Seiichi Saitou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 919 days.

(21) Appl. No.: 09/632,164

(22) Filed: Aug. 3, 2000

(30) Foreign Application Priority Data

Nov. 30, 1999 (JP) .......................................... 11-339299

(51) Int. Cl.$^7$ .............................. H04N 5/91; H04N 7/26
(52) U.S. Cl. .......................... 386/81; 386/68; 386/109
(58) Field of Search .............................. 386/82, 81, 68, 386/69, 70, 109, 111, 112, 46, 1, 27, 37, 6, 40, 124, 125; 360/32; H04N 5/91, 7/26

(56) References Cited

U.S. PATENT DOCUMENTS

| | | | | |
|---|---|---|---|---|
| 5,377,051 A | * | 12/1994 | Lane et al. | 386/81 |
| 5,418,658 A | * | 5/1995 | Kwon | 360/48 |
| 5,589,993 A | * | 12/1996 | Naimpally | 386/81 |
| RE37,881 E | * | 10/2002 | Haines | 386/92 |

FOREIGN PATENT DOCUMENTS

| | | |
|---|---|---|
| JP | 5-276491 | 10/1993 |
| JP | 8-46913 | 2/1996 |
| JP | 8-98140 | 4/1996 |
| JP | 8-125966 | 5/1996 |

OTHER PUBLICATIONS

ITE Technical Report, vol. 23, No. 75, pp. 19–24 including English Translation.

* cited by examiner

Primary Examiner—Robert Chevalier
(74) Attorney, Agent, or Firm—McDermott Will & Emery LLP

(57) ABSTRACT

The present invention provides a digital signal recording apparatus and a recording medium for recording digital compressed picture information on magnetic tape, and specifically the structure of the recording apparatus that suitably records picture trick-play data separately from recording data for a normal replay and the recording medium on which data is suitably recorded.

The digital signal recording apparatus includes picture data extraction circuit (103) for extracting picture data from the input digital compressed picture signal, trick-play-data generation means (105) for generating trick-play data while reducing the extracted picture data, and data disposition circuit (106) for disposing the trick-play data on tracks in position falling in line with the trace of the rotary magnetic head scanning in trick-play mode. The trick-play-data generation means (105) operates through program processing of a microprocessor (105). In addition, the recording apparatus generates trick-play data respectively applied to fast forward operation and rewind operation and record the data in predetermined locations on a medium, whereby faster display update on screen during the trick-play is achieved and rewind and replay operation can be performed suitably.

3 Claims, 15 Drawing Sheets

TAPE TRAVELING ←

FIG.8
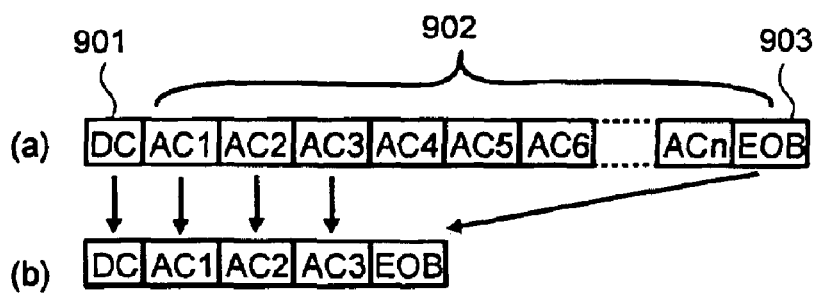
FIG.9
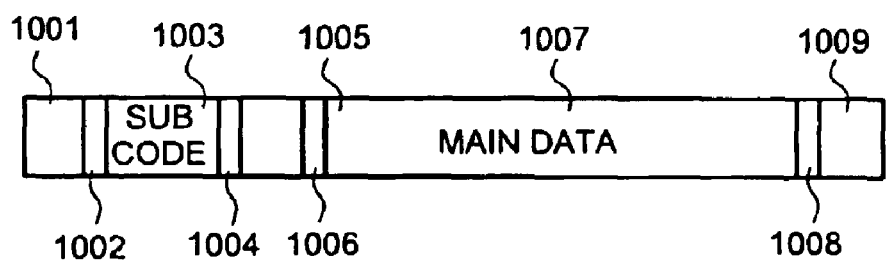
FIG.10

DIGITAL SIGNAL RECORDING APPARATUS AND RECORDING MEDIUM

BACKGROUND OF THE INVENTION

The present invention relates to a digital signal recording apparatus and a recording medium for recording digital compressed picture information on magnetic tape, and specifically the structure of the recording apparatus that suitably records picture data for a trick-play separately from recording data for a normal replay and the recording medium on which data is suitably recorded.

Digital broadcasting such as, typically, digital satellite broadcasting is spreading widely. Video tape recorders (VTRs) to record and replay digital broadcasts with digital signals being as is are proposed.

In digital broadcasting, picture information is compressed and transmitted through the use of a digital picture compression technique for effective use of radio wave bands. A typical digital picture compression technique in use is a Moving Picture Expert Group (MPEG) method. Digital picture compression reduces data quantity by making good use of mutual connections between successive picture data frames.

VTRs for recording digital compressed pictures have difficulties with trick-play operations such as fast forward and rewind. This is because digital picture compression uses mutual connections between frames and reproducing pictures from part of the picture signals from magnetic tape is attempted when a trick-play is requested, but original pictures cannot be restored from only the part of the signals.

To resolve this problem, VTR systems have been proposed that record in advance only intra-frame coded pictures on magnetic tape in position that a rotary magnetic head passes as it scans in trick-play mode without using mutual connections between frames. (These systems are described in Japanese Patent Prepublication Nos. Hei8-46913 and Hei8-98140.) These systems make it possible to reproduce intra-frame coded picture data from magnetic tape and restore pictures in trick-play mode.

Another VTR system compresses data at a higher compression rate and records the compressed data in position on magnetic tape in a separate process from the process of a normal replay of digital compressed pictures, which is described in Japanese Patent Prepublication No. Hei5-276491. This system, which converts input picture signals into digital compressed signals to record picture data, uses a separate higher-rate compression circuit for executing data compression at a higher rate to generate trick-play data, separately from the normal compression process, and disposes the data in place on magnetic tape. In this way, pictures are properly reproduced even during a trick-play.

Furthermore, recording and replay equipment that records picture data while removing all or part of the fixed patterns and redundant data of picture data is described in Japanese Patent Prepublication No. Hei5-125966. This recording and replay equipment extracts intra-frame coded data from input picture information and deletes headers, high-band coefficients of AC components, fixed bit patterns, etc. from the data when recording the data. The device reconstructs MPEG bit streams by inserting the deleted data when executing a replay.

BRIEF SUMMARY OF THE INVENTION

The above VTR systems have the following problems.

The VTR system described in Japanese Patent Prepublication No. Hei5-276491 has a higher-rate compression circuit to execute data compression at a higher rate, separately from the compression circuit for normal replay use. For example, digital picture signals transmitted by digital broadcasting, however, have been compressed beforehand. A broadcasting station determines a data compression rate that cannot be controlled by the VTR. To perform data compression again, the VTR must return compressed signals to decompressed picture signals by using a decoder and then generate higher-rate compressed data by using the higher-rate compression circuit. This VTR must include a decoder for decoding compressed signals to record digital compressed signals that have been compressed beforehand, such as digital broadcast signals. Thus, the system offered in the above publication is not suitable for VTRs that record previously compressed signals like digital broadcast signals.

The VTR systems described in Japanese Patent Prepublication Nos. Hei8-46913 and Hei8-98140 extract only intra-frame coded pictures from input streams and record them as the trick-play data. However, a broadcasting station determines the data quantity of intra-frame coded pictures when executing picture data compression, but the VTR cannot control this data quantity.

Generally, the data quantity of intra-frame coded pictures tends to be larger than that of inter-frame coded pictures. Because the quantity of data that can be reproduced-for a trick-play is very small, the number of picture pages to be reproduced during a trick-play is quite limited if intra-frame coded picture data is applied as is to the trick-play. This causes a drawback of delay of screen update during a trick-play.

For the VTR described in Japanese Patent Prepublication No. Hei5-125966, the hardware executes all processing, causing a problem of very large circuit size. For this VTR, a flexibility problem for different formats of broadcast data is also liable to arise.

According to, for example, a D-VHS special replay system (pp. 19–24) described in ITE Technical Report Vol. 23, No. 75; issued on Nov. 11, 1999, this system uses signal processing circuits with about 40,000 gates and 4-megabit storage unit to generate trick-play data.

However, real-time processing by hardware is not required to generate and record trick-play data, because the data size to be recorded for a trick-play is extremely smaller than the data to be recorded for a normal replay.

Microprocessors are generally used to control signal processing circuits. However, such proposal is not presented that a microprocessor executes processing to generate trick-play data.

A primary object of the present invention is to provide a digital signal recording apparatus and a recording medium suitable for generating trick-play data through the use of a microprocessor.

The above publications about recording trick-play data do not disclose a method of recording picture data and accompanying time information. Particularly, these publications do not disclose a method of altering picture data recording sequence and time information; i.e., the method required for the digital signal recording apparatus to record differently arranged data for trick-plays in both fast forward and rewind directions. To make data adaptive to both fast forward and rewind operations, it is very important to manage data recording sequence and time information.

A second object of the present invention is to provide a digital signal recording apparatus that can record trick-play data adaptive to both fast forward and rewind operations and a recording media on which trick-play data is recorded so as to be adaptive to both fast forward and rewind operations.

To attain the above objects, a digital signal recording apparatus according to the present invention comprises picture data extraction circuit for extracting picture data out of input digital compressed picture signals, trick-play-data generation means for generating trick-play data from the picture data through program processing by a microprocessor, data disposition circuit for disposing the trick-play data on tracks in position falling in line with the trace of the rotary magnetic head scanning in trick-play mode, and storage unit for storing picture data extracted by the picture data extraction circuit and trick-play data that is disposed by the data disposition circuit.

The picture data extraction circuit extracts intra-frame coded pictures.

The digital signal recording apparatus is defined wherein picture data is analyzed into spatial frequency components through the use of Discrete Cosine Transform and the trick-play-data generation means cuts high-band spatial frequency components from the picture data.

The digital signal recording apparatus according to the present invention is further defined wherein the data disposition circuit disposes data for fast forward trick-play on tracks in predetermined fast-forward data recording locations falling in line with the trace of the rotary magnetic head scanning in fast forward mode and data for rewind trick-play on tracks in predetermined rewind data recording locations falling in line with the trace of the rotary magnetic head scanning in rewind mode.

The data disposition circuit is designed to dispose the data for rewind trick-play by rearranging the blocks of the trick-play data to constitute a complete picture on screen in sequence of reproducing data by rewind and reproduction.

The data for forward trick-play and the data for rewind trick-play are generated on the basis of same picture information and different time information.

A recording medium according to the present invention is defined as the medium on which data for fast forward trick-play is disposed and recorded in predetermined fast-forward data recording locations falling in line with the trace of the rotary magnetic head scanning in fast forward mode and data for rewind trick-play is disposed and recorded in predetermined rewind data recording locations falling in line with the trace of the rotary magnetic head scanning in rewind mode.

BRIEF DESCRIPTION OF THE DRAWINGS

These and other objects, features and advantages of the present invention will become more readily apparent from the following detailed description when taken in conjunction with the accompanying drawing wherein:

FIG. 8 is the arrangement matrix of spatial frequencies;

FIG. 9 shows a method of reducing spatial frequencies;

FIG. 10 is the structure of a track;

DETAILED DESCRIPTION OF THE INVENTION

A VTR as an example of the embodiment of recording and replay equipment according to the present invention will be described below.

Figure 1:
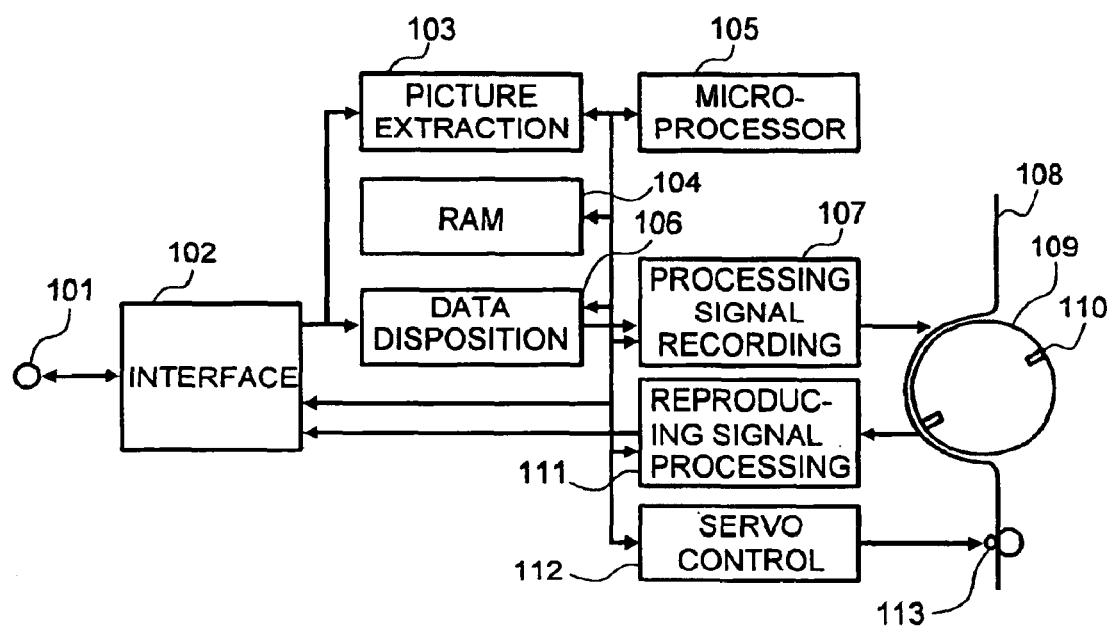
FIG. 1 is the block diagram of a digital signal recording apparatus (VTR) according to the invention.

FIG. 1 shows the block diagram of a VTR configuration according to the present invention. The VTR configuration includes a connector 101 for making the connection with an external device, an interface circuit 102, an picture extraction circuit 103, a RAM 104, a microprocessor 105 to generate trick-play data, a data disposition circuit 106, a recording signal processing circuit 107, magnetic tape 108., a rotary drum 109, a magnetic head 110, is a reproductive signal processing circuit 111, a servo control circuit 112 and a capstan 113.

The VTR shown in FIG. 1 records digital signals that are input from an external device such as a digital broadcast tuner and performs replay operation. The external device is connected to the VTR through the connector 101. The interface circuit 102 executes data transmission and reception to/from the external device. The interface in use shall comply with standards; e.g., IEEE 1394.

First, recording operation will be explained below. A recording start command is input from a switch (not shown), a remote controller (not shown), or the like to the microprocessor 105. Alternatively, the recording start command is input from the external device through the interface circuit 102 to the microprocessor 105. The microprocessor 105 sets a data recording rate, magnetic tape run speed, and other required settings, according to the recording start command, and starts recording operation. During the recording operation, picture and audio packets to be recorded are input from the external device to the interface circuit 102.

Figure 2:
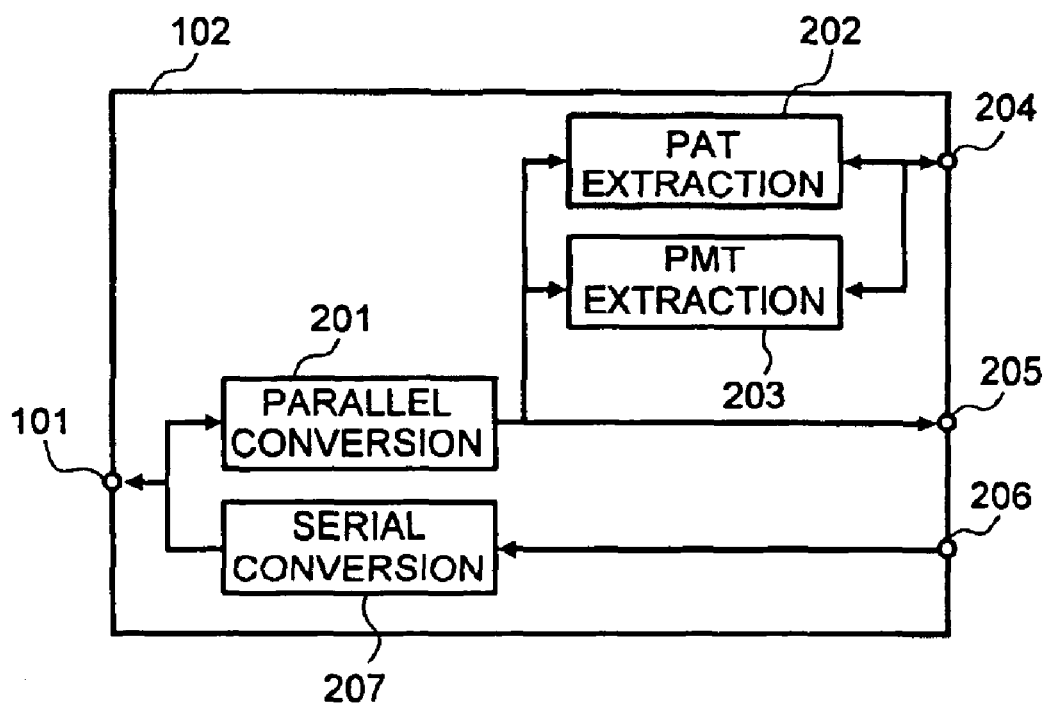
FIG. 2 is the block diagram of interface circuit.

FIG. 2 shows a detailed block diagram of the interface circuit 102. The interface circuit 102 includes a parallel conversion circuit 201, a PAT detection circuit 202, a PMT detection circuit 203, a terminal port 204 interfacing with the microprocessor 105, a packet output port 205, a packet input port 206 and a serial conversion circuit 207. As provision required to detect the IDs of all packets, a PAT extraction circuit 202 and a PMT extraction circuit 203 are incorporated into the interface circuit 102. Input packets are, for example, MPEG transport packets.

Figure 3:
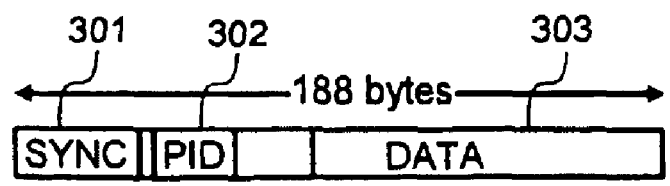
FIG. 3 is the schematic of structure of a MPEG transport packet.

FIG. 3 shows the structure of an MPEG transport packet. The packet includes a synchronous byte 301, packet ID 302 and packet data 303. For MPEG transport packets, data transmission in 188-byte packets is generally performed. At the beginning of a packet, a synchronous byte 301 exists to assure the detection of synchronization and this byte is used to detect the boundary between packets. The synchronous byte is one byte long and contains a hexadecimal value of "47." Any packet includes packet ID 302 for packet identification in a given position. The packet ID is 13 bits long and differs, according to the packet type such as picture packet, audio packet, or additional information packet. What information associated with a packet ID can be found by referring to packets called a Program Association Table (PAT) and packets called a Program Map Table (PMT).

The interface circuit 102 first executes parallel conversion of input signals into 8-bit byte data through the parallel conversion circuit 201. The interface circuit 102 also converts the data into 188-byte MPEG transport packets by detecting the synchronous byte 301. The 188-byte MPEG transport packets are input to the PAT extraction circuit 202 and the PMT extraction circuit 203, and, at the same time, output from the packet output port 205 and supplied to the picture extraction circuit 103 and the data disposition circuit 106.

The PAT extraction circuit 202 extracts packets with a packet ID of 0 from the Program Association Table (PAT). The PAT contains the information about what numbers of multiplex programs are broadcast by the transmitted packets. Detailed information for individual multiplex programs is included in the Program Map Table (PMT). By analyzing the information contained in the PAT, PMT packets IDs can be identified. For packets to be recorded by VTR, the PAT usually includes a single PMT packet ID for each broadcast program. The microprocessor 105 reads the PAT extracted by the PAT extraction circuit, analyzes the contents of the PAT, and finds PMT packet IDs.

Then, the microprocessor sets the PMT packet IDs to be extracted from the PMT and gives them to the PMT extraction circuit 203 which in turn extracts these packet IDs from the PMT. Because PMT packet IDs differ, depending on the packet contents, the circuit structure is designed such that packet IDs to be extracted can be set from the external. To the PMT, information is written about what packet IDs correspond to voice, picture, and additional information transmitting packets. After having extracted PMT packet IDs, the microprocessor 105 analyzes the PMT packet IDs and determines packet IDs of the packets containing picture information. By processing in this way, determination can be made of IDs of the packets containing picture information among the packets received by the interface.

Figure 4:
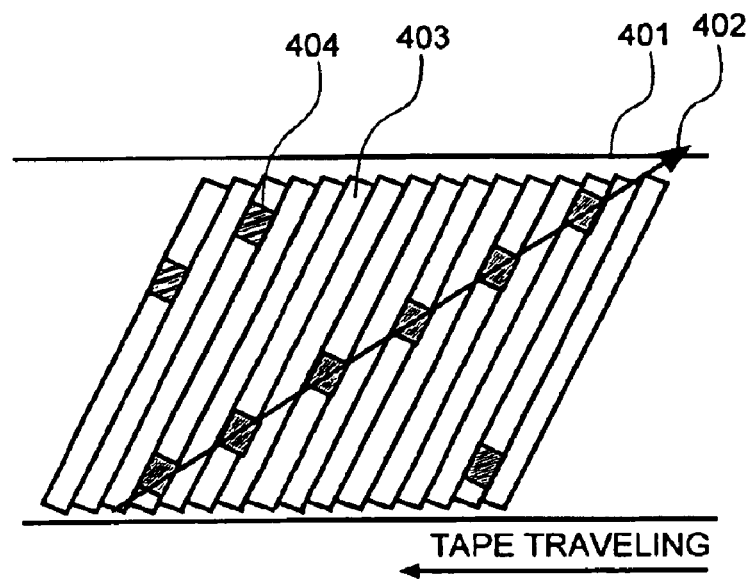
FIG. 4 is the trace of rotary magnetic head scanning in trick-play mode.

FIG. 4 shows the trace of a rotary magnetic head scanning in the forward direction in trick-play mode at a rate of 12 times as fast as normal scan speed (12-fold speed). Reference numeral 401 is magnetic tape; 402 is a rotary magnetic head; 403 is a recording track; and 404 is a representative data field from which data is reproduced for a trick-play. In response to a trick-play request, the rotary magnetic head 110 moves across a plurality recording tracks on the magnetic tape 401 to reproduce data. From only the shaded sections 404 of the tracks, the data can be reproduced. During trick-play operation, thus, the VTR must be able to restore pictures from the data reproduced from the fields 404.

Meanwhile, picture data compression according to the MPEG method compresses data by making good use of mutual connections between successive frames to increase the efficiency of picture data compression. Data in frames is classified into an intra-frame coded picture (I picture), a predictive coded picture (P picture), and bidirectionally predictive coded picture (B picture). The intra-frame coded picture consists of intra-frame information only. The predictive coded picture includes the information for the change from the preceding picture frame and the bidirectionally predictive coded picture includes the information for the change from the preceding and following frames. To restore a predictive coded picture, thus, the information on the previously restored reference picture is required. Similarly, decoding a bidirectionally predictive coded picture is not possible without the preceding and following picture information.

Picture data to be reproduced for a trick-play is initially located apart from each other on tape and mutual connections between these discrete picture data cannot be expected. Because the VTR needs to make a picture display promptly on starting a trick-play, it must be able to restore a picture only from the just reproduced data in a frame without referring to its preceding and following frames. To restore pictures by trick-play, therefore, the VTR must use intra-frame coded picture pictures only and record them in the fields 404. To accomplish this, the VTR executes extraction and disposition of intra-frame coded picture data. How to extract intra-frame coded picture data will be explained below.

Figure 5:
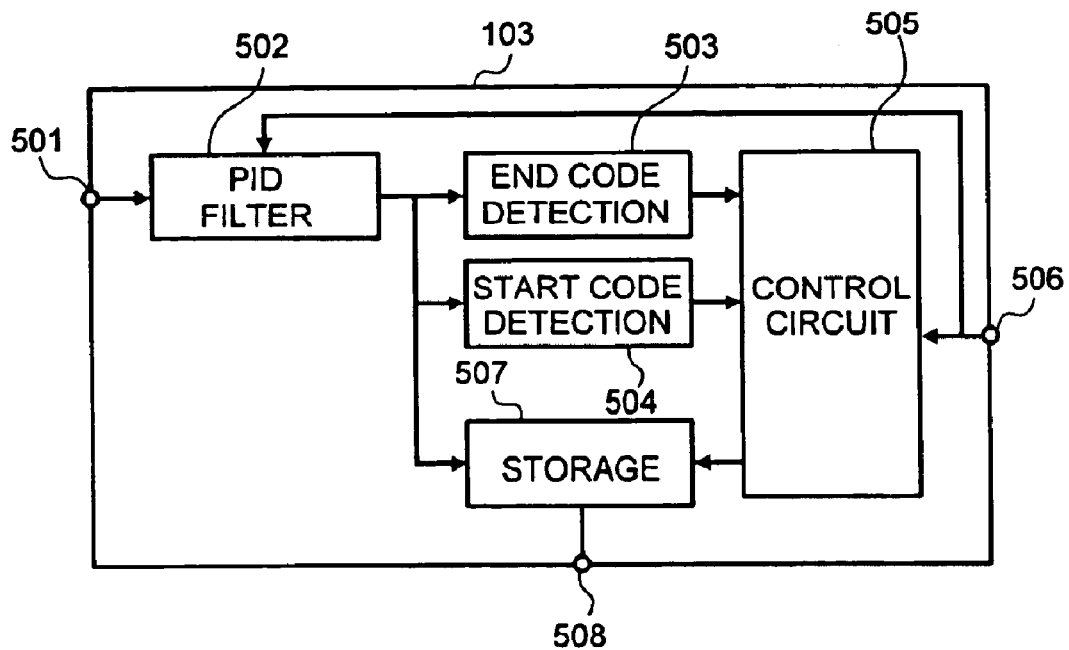
FIG. 5 is the block diagram of picture extraction circuit.

FIG. 5 shows the block diagram of the picture extraction circuit 103 to extract intra-frame coded picture data. The picture extraction circuit 103 includes a packet input port 501 through which packets are input, a PID filter circuit 502, a start code detection circuit 503, an end code detection circuit 504, a control circuit 505, an I/O port 506 through which control signals are sent to and received from the microprocessor 105, storage unit 507 and an output port 508 through which extracted image data is output.

Figure 6:
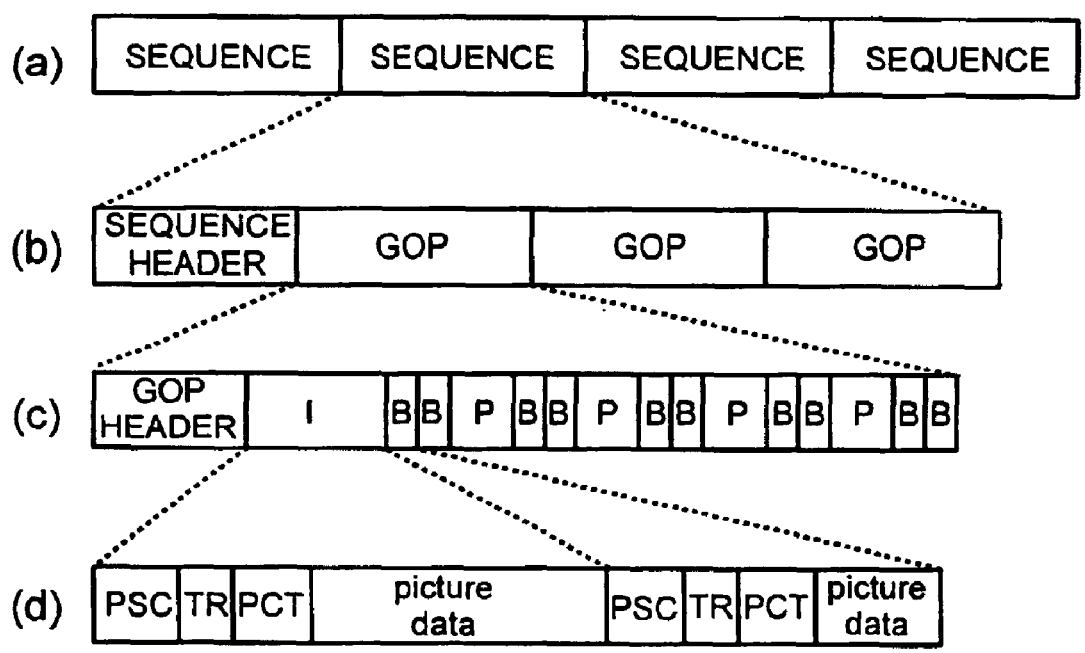
FIG. 6 is the data format of picture information according to MPEG method.

FIG. 6 shows the data format of picture information according to the MPEG method. Packet data from the interface 102 is input at the input port 501. Input packets are 188-byte transport packets as shown in FIG. 3.

The PID filter 502 picks out appropriate packets from the input packets by packet ID. All packets include packet ID as described above, and voice, picture, and additional information packets are differentiated by packet ID. The picture extraction circuit 103 extracts only picture information packets. The picture information packet IDs detected in advance through the PAT and PMT analysis are set in the PID filter 502 such that only image information packets will be selected. This setting suppresses the processing for voice and additional information packets, thus avoiding unwanted processing; as well as prevents incorrect extraction. On the data in the picture packets that have been identified so through judgment by packet ID, start code and end code detection is performed.

According to the MPEG method, all picture data is transmitted in units of so-called sequences as shown in FIG. 6(a). A sequence comprises a sequence header and some GOPs (Groups Of Pictures) that follow the header as shown in FIG. 6(b). The sequence header contains the information required for restoring a picture, such as resolution of picture data, frame rate, etc. The GOPs are units of picture data compression processing and a GOP usually comprises a plurality of picture data frames and contains at least one intra-frame coded picture.

As shown in FIG. 6(c), a GOP begins with a GOP header and its main part comprises an intra-frame coded picture following the header and several picture data. At the beginning of each frame of picture data contained in the GOP, an identification code called Picture Coding Type (PCT) precedes each picture data to identify what kind of structure of each picture data.

Specifically, as shown in FIG. 6(d), a picture frame includes Picture Start Code (PSC) to indicate a picture start position, Temporal Reference (TR) to indicate order in which the picture is displayed and the PCT that follows the TR. The PSC contains a value of 32 bits corresponding to a hexadecimal value of "00000100." The TR contains a value of 10 bits to indicate that the picture shall be displayed in the n-th order among the GOP. The PCT contains a value of 3 bits to represent, for instance, "1" that corresponds to intra-frame coded picture (I picture). "2" that corresponds to predictive coded picture (P picture), and "3" that corresponds to bidirectionally predictive coded picture (B picture).

To extract intra-frame coded picture data, detecting the start and end of intra-frame coded picture data is necessary. For this purpose, the picture extraction circuit 103 includes the start code detection circuit 503 and the end code detection circuit 504 to detect the start and end of intra-frame coded picture data.

The start code detection circuit 503 is a circuit to detect a start code of an intra-frame coded picture and sees whether a start code of an intra-frame coded picture exists in the input packets. At the beginning, any intra-frame coded picture data includes picture start code, and subsequent temporal reference and picture coding type. Thus, the start code detection circuit 503 shall detect a picture start code and check the subsequent picture coding type to see whether it is "1" corresponding to intra-frame coded picture, but ignoring the temporal reference because the temporal reference does not directly relate to the detection. Each time a packet is input, the start code detection circuit 503 attempts to detect this start pattern and sends the result of detection to the microprocessor 105.

On the other hand, the end code detection circuit 504 is a circuit to detect the end of intra-frame coded picture data. However, because there is no particular pattern indicating the end of intra-frame coded picture data, this circuit 504 attempts to detect a picture start code or a sequence or GOP start code that follows intra-frame coded picture data to determine whether the intra-frame coded picture data terminates. Specifically, this circuit 504 determines whether the following picture packet includes the "00000100" picture start code or whether the following packet includes the "00000100" sequence start code or "000001B5" GOP start code and sends the result to the microprocessor 105.

Internal processing operation of the picture extraction circuit 103 will be explained below.

Figure 7:
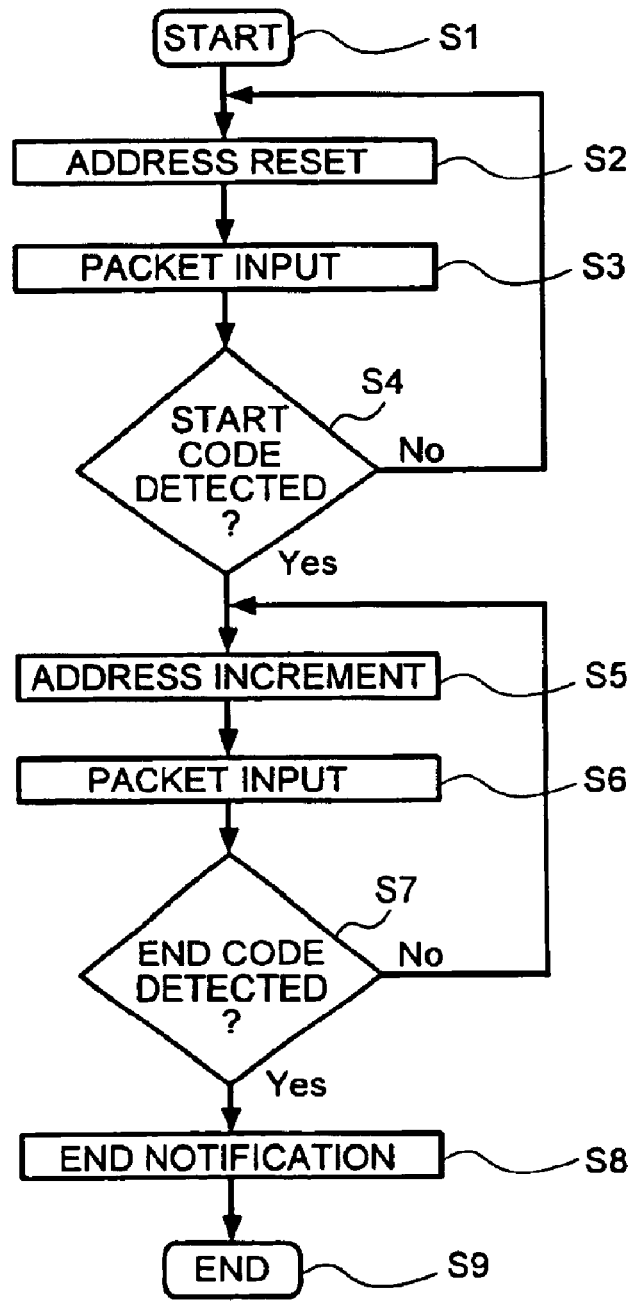
FIG. 7 is the flowchart of control operation of picture extraction circuit.

FIG. 7 is a flowchart for explaining the internal processing operation of the control circuit 505. When the microprocessor 105 requests the control circuit 505 to start picture data extraction, the control circuit 505 starts picture data extraction processing (S1). First, it resets the current address in the storage for writing packets (S2) and allows packet input (S3). Because the address for writing has been reset in the storage, the input packets are stored into the storage from its foremost location. When packet input has been completed, the control circuit 505 determines whether a start code exists in the input packets, according to the result of detection executed by the start code detection circuit 503 (S4).

If no start code is included in the packets, the control circuit 505 judges that intra-frame coded picture data has not been delivered to the storage and resets again the address pointer (S2). In this way, the input packet data is repeatedly overwritten into the foremost location in the storage until intra-frame coded picture data has been delivered to the storage.

If a start code has been detected, which indicates that intra-frame coded picture data has been delivered to the storage, the control circuit 505 increments the address pointer (S5) and prepares for receiving the next block of packets. Then, the packets containing intra-frame coded picture data have been stored into the storage.

Furthermore, the control circuit 505 allows the next packet input (S6). At this time, the end code detection circuit 504 determines whether the input packets include an end code. Each time a packet is input, the control circuit refers to the result of detection executed by the end code detection circuit 504 to see whether an end code has been detected (S7).

If no end code has been detected, the control circuit 505 judges that intra-frame coded picture data packets are continuously delivered and increments the address for writing (S5), and continues to allow packet input (S6). In this way, successive packets are sequentially stored into the storage as long as the delivery of intra-frame coded picture data packets continues.

If an end code has been detected, the control circuit 505 notifies the microprocessor 105 that picture extraction has terminated through the I/O port 506 (S8) and completes processing sequence (S9).

By the above processing, picture packets containing intra-frame-coded picture data are extracted in the storage 507. The extracted intra-frame-coded picture data is output through the output port 508 to the RAM 104.

In the above description, the picture extraction circuit 103 includes a separate control circuit 505, which is, however, not limited to this configuration; otherwise, for example, the microprocessor 105 may control picture data extraction instead.

The storage 507 in the picture extraction circuit 103 is not always provided as separate storage; otherwise, for example, part of the storage used for the recording signal processing circuit 107 may be used to store extracted picture data.

Next, generating trick-play data will be explained below. The RAM 104 stores the intra-frame coded picture data extracted by the picture extraction circuit 103 and modification to the intra-frame coded picture data structure is performed by the microprocessor 105, thus reducing the data quantity.

First, the structure of intra-frame coded picture data will be briefly explained. Digital picture compression according to the MPEG method cuts high-band spatial frequencies to compress intra-frame coded pictures. A picture compression device first divides picture information in one frame into sub-blocks with eight pixels in the vertical direction by eight pixels in the horizontal direction. The picture compression device executes Discrete Cosine Transform (DCT) for the pixel data in a sub-block, whereby the picture data is transformed Into spatial frequency information with eight frequency components in the vertical direction by eight frequency components in the horizontal direction.

Then, the picture compression device quantizes the spatial frequency information, according to a predetermined quantization table, and thus obtain alternating current (AC)

components and arrange them in order from lower frequency to higher. Specifically, the AC components can be arranged in order as shown in FIG. 8. Because natural pictures generally tend to have less high frequency components, most of the high-band components, which are the AC components arranged in the rear part of the array, tend to have a value of 0. Moreover, because the cut of high-band components little affects visualization, coarser quantization such that a value less than a predetermined value is regarded as being 0 can be applied. Data quantity is reduced by arranging only effective data in the front part of the array of AC components and cutting the data in the rear part of the array.

The thus created parameters of AC components are combined with the direct current (DC) components in the sub-block, which do not have frequency components, into picture data of the sub-block. Although a maximum 64 AC components exist, high-band components are almost 0 as described above, and consequently necessary low-band components are solely described and a end of block (EOB) is appended to the last parameter, indicating that the remaining high-band components do no exist. These parameters and the end of block are coded with variable-length codes in bits. By executing the above transformation and processing for all sub-blocks in the frame, compressed intra-frame coded picture data is generated.

Next, the operation of data quantity reduction will be explained below.

FIG. 9 shows the structure of data in a sub-block. Reference numeral 901 is a DC component; 902; is an AC component; and 903 is a end of block. All sub-blocks of an intra-frame coded picture data frame extracted by the picture extraction circuit 103 have the data structure as shown in FIG. 9(a), where n is an integer not greater than 64.

To reduce data quantity, some of AC components of the data in a sub-block are cut. As shown in FIG. 9(b), specifically, AC components of the sub-block are limited to a predetermined number of effective AC components and those more than the predetermined number are cut. Thus, data quantity is reduced by cutting the AC components with high-band frequency information. FIG. 9(b) shows a case where the number of AC components is reduced to n=3. Of course, this number may be set variable by taking data quantity and picture quality into consideration. Even if data quantity is largely reduced as in this case, the essential quantity of the picture reproduced by trick-play does not deteriorate. From the picture compression data subjected to such data reduction, the picture can be reproduced by using a conventional decoder. By thus cutting some AC components in all sub-blocks of a frame, the whole data quantity of an intra-frame coded picture is reduced.

Intra-frame coded picture data whose quantity has thus been reduced is restructured into packets and sent to the data disposition circuit 106. Because of the reduced data quantity of intra-frame coded pictures, the effective number of pages of pictures to be reproduced by trick-play increases to an extent that depends on the cut data quantity. Consequently, rapid picture update on the screen can be performed even during trick-play operation.

To allow the VTR to perform the prompt replay of reproduced pictures in trick-play mode, in addition to the packets of the reduced intra-frame coded picture data, the Program Association Table (PAT) and the Program Map Table (PMT) are simultaneously stored into the trick-play data area. The contents of the PMT must be modified because trick-play data does not include voice data and broadcast program information.

Moreover, a Program Clock Reference (PCR) packet is added to each picture trick-play data as time information in the beginning part of the data. This 33-bit packet serves as the reference for generating a decoder operating clock. The magnetic tape run speed in trick-play mode is faster than that in normal replay mode. Consequently, picture trick-play data is reproduced faster than the data for a normal replay, and therefore the former data shall be recorded, based on the time information of lower rate time steps. If, for example, data for a 12-fold speed trick-play is recorded in locations on track T, the PCR shall contain time information stepped by dividing the time taken for the scan for normal replay to reach track T by 12.

In the beginning part of each picture data for a trick-play, besides, a Decoding Time Stamp (DTS) to specify the start of decoding the picture data and a Presentation Time Stamp (PTS) to specify the time at which the picture is displayed are added to the data. These time information shall also be set in lower rate time steps of time change suitable for trick-play speed as in the same manner as for PCR.

The data disposition circuit 106 disposes the input packets and the packets for a trick-play in position. Trick-play data shall be recorded on the magnetic tape in locations in the course of scanning of the rotary magnetic head during trick-play operation.

Next, the structure of a track on the magnetic tape will be explained below.

FIG. 10 shows the structure of one track. Reference numerals 1001 and 1009 are the margins at both ends of tape; 1002 is the preamble of sub-code; 1003 is sub-code recording area; 1004 is the postamble of sub-code; 1005 is a gap; 1006 is the preamble of main data; 1007 is main data recording area; and 1008 is the postamble of main data.

All tracks have the sub-code recording area 1003 as well as the main data recording area 1007. The sub-code area 1003 is used to record recording format information, broadcast program information, and others. The preambles 1002 and 1006 respectively precede the sub-code and main data recording areas and the postambles 1004 and 1008 respectively follow these areas. Between the sub-code area 1003 and the main data area 1007, the gap 1005 is provided so that each area can be rewritten independently.

Figure 11:
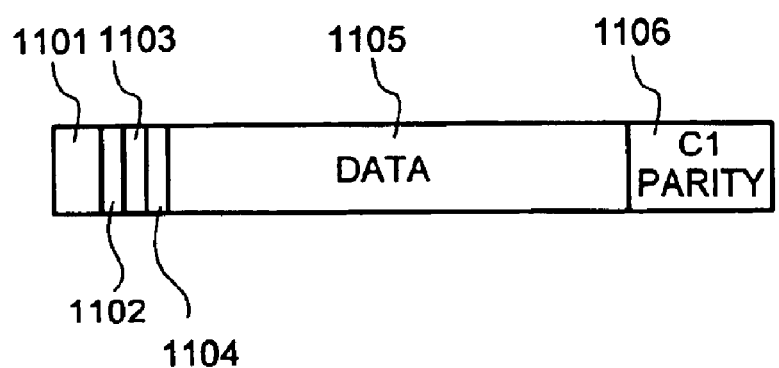
FIG. 11 is the structure of a sync block.

FIG. 11 shows the structure of a sync block in the main data area. Reference numeral 1101 is a sync byte; 1102 is ID0; 1103 is ID1; 1104 is ID parity; 1105 is main data; and 1106 is inner parity. The main data recording area 1007 comprises 336 sync blocks. Each sync block comprises a two-byte sync byte 1101, ID0 (1102) and ID1 (1103), each of which is one byte, one-byte ID parity 1104, 99-byte data area 1105, and eight-byte inner parity (C1 parity) 1106, arranged in this order from the beginning of the block.

The sync byte 1101 is to represent the boundary between blocks and ID0 and ID1 make it possible to locate the sync block. By checking the ID parity 1104, whether these IDs are valid can be determined. Because the sync byte 1101 and the IDs (1102 and 1103) are written into each sync block, the data in the sync block can be reproduced properly, even for a case where the rotary magnetic head scans across a plurality of tracks to reproduce the trick-play data.

The main data 1105 is area into which packet data is recorded. The eight-byte inner parity 1106 is added to each main data so as to be used for error correction to be executed such that correct data can be obtained in the event of an error occurring during replay operation.

Figure 12:
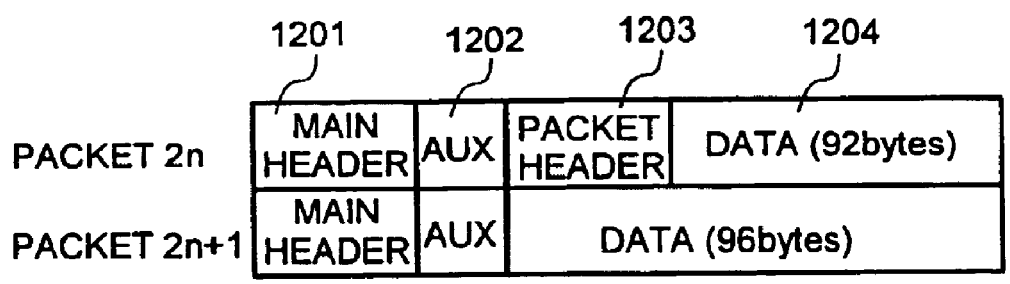
FIG. 12 is the structure of main data in a sync block.

FIG. 12 shows the detail of main data 1105 of a sync block. Reference numeral 1201 is a main header; 1202 is auxiliary data; 1203 is a packet header; and 1204 is a packet. As shown in FIG. 12, a 188-byte MPEG packet is recorded by dividing it into two sync blocks. The main data 1105 in a sync block has 99-byte recording area, first two bytes of which constitute the main header 1201 that indicates the contents of the sync block. This area also includes one-byte auxiliary data recording area 1202. Besides, four-byte time information 1203 is added to the MPEG packet and a total of 192-byte packet data is divided into two sync blocks.

The main header 1201 specifies the type of the data recorded in the packet. For example, the main header 1201 may be set to 0 for normal replay data, 2 for trick-play data, and 1 for a packet containing no records. Besides, a code to indicate either the first or second half of data contained in the packet and information on that the packet is used for a trick-play whose speed is what times as fast as normal speed are recorded in the main header 1201.

By the way, during trick-play mode, the rotary magnetic head 111 scans across a plurality of tracks on the magnetic tape 108 as shown in FIG. 4.

To data for a normal replay, besides the inner parity (C1 parity), outer parity (C2 parity) is added to each sync block, assuring that error correction can be executed even in the event of failure of error correction per sync block or sync block allocation.

Figure 13:
FIG. 13 is the structure of a packet for trick-play.

During trick-play mode, it is also necessary to enhance error correction potential by using such outer parity. Because normal outer parity, however, cannot be applied to data to be reproduced in trick-play mode, special parity for trick-play data is added. Specifically, 10 external parties are added to 102-word sync blocks as shown in FIG. 13. Thus structured 112 sync blocks for trick-play operation are disposed in locations 404 that the rotary magnetic head scans in trick-play mode.

Figure 14:
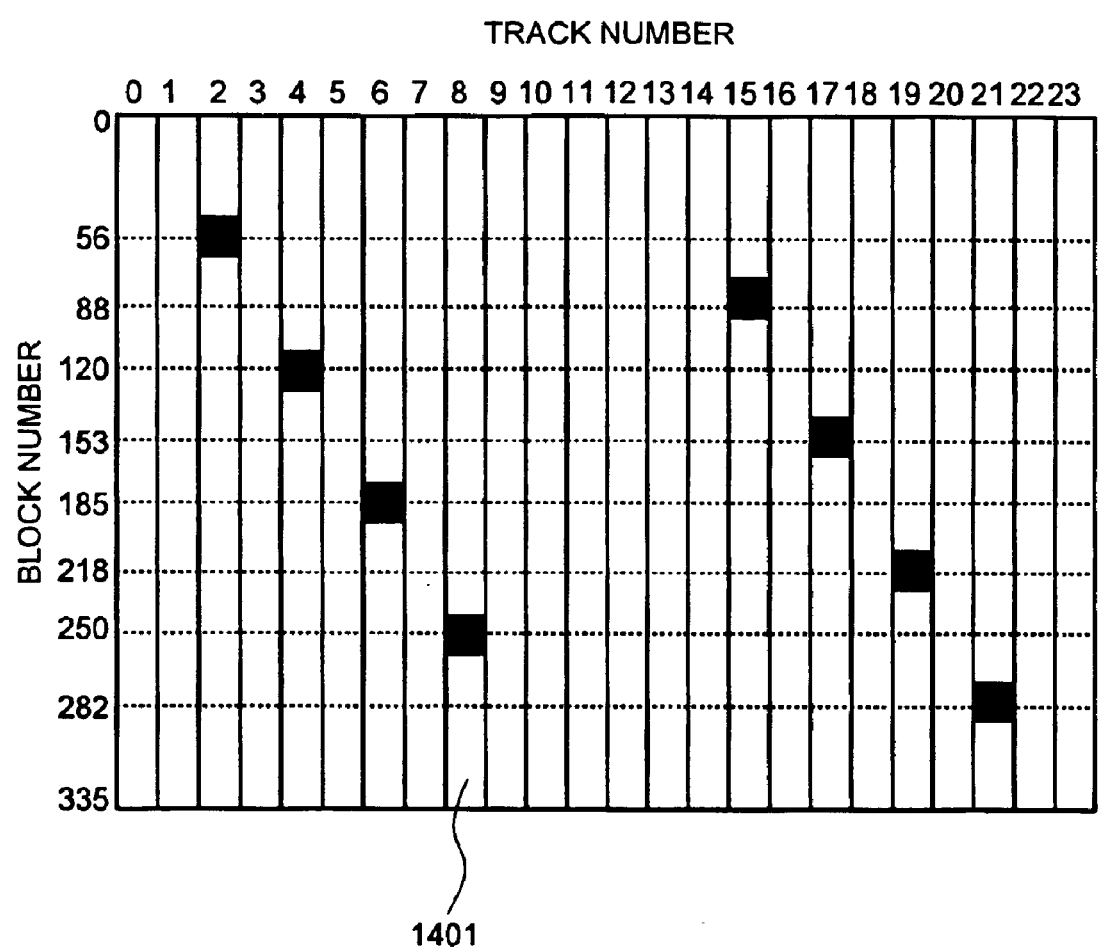
FIG. 14 illustrates disposing trick-play data.

FIG. 14 shows the data locations that the rotary magnetic head scans in 12-fold speed replay mode. Reference numeral 1401 represents data to be reproduced in 12-fold speed replay mode. Because VTRs usually perform azimuth recording, data is reproduced in 24-track cycles in 12-fold speed replay mode when taking both positive and negative azimuth heads into consideration. To reproduce data during trick-play mode, it is necessary to dispose data in advance in these locations that the rotary magnetic head scans.

Because trick-play data comprises 112 sync blocks shown in FIG. 13, the sync blocks are divided into sets comprising 14 blocks and each set of 14 blocks is disposed in each field 1401. When necessary, recording the trick-play data may be repeated, allowing for track curving or tracking deviation attributed to an individual VTR.

On the other hand, normal recording data is recorded in locations other than the recording locations 1401 for trick-play data. Through the above processing, the trick-play data can be embedded in position.

Next, the VTR executes recording signal processing to record data on the magnetic tape.

Figure 15:
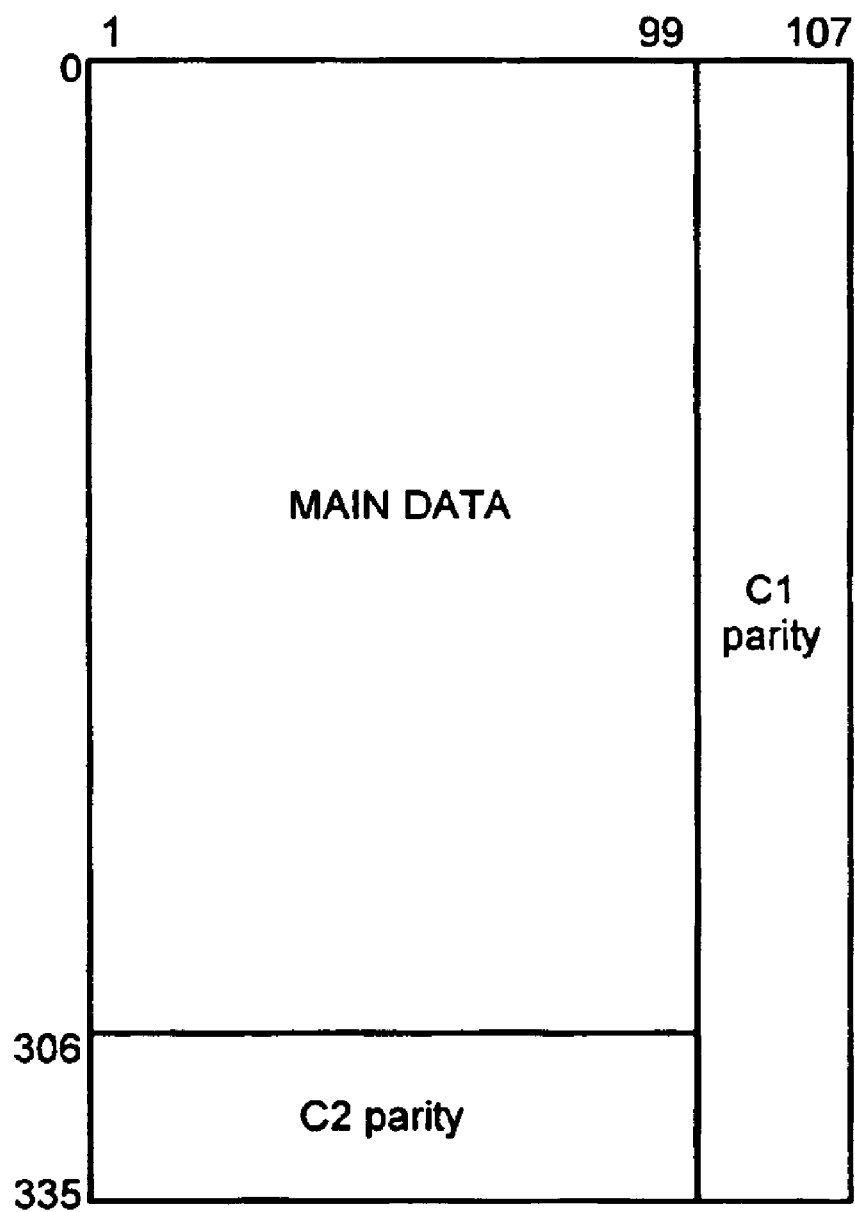
FIG. 15 is the structure of a packet of main data.

FIG. 15 shows the format of recording signal data. Sync block's main data 1105, each of which is 99 bytes, is assembled into 306-word main data that is the data to fill one track. The 306-word main data is divided into three parts, to each of which 10-byte outer parity (C2 parity) is added. Thus, a total of 30-word outer parity is generated and recorded in sync blocks of numbers from 306 to 335. To each sync block's data, 8-word inner parity (C1 parity) is added.

To each sync block, furthermore, the sync byte 1101, ID0 (1102) and ID1 (1103), and the ID parity 1104 are added, as shown in FIG. 11. After subjected to given demodulation processing, each sync block is supplied to the rotary magnetic head 110. The rotary magnetic head 110 records the signals that have been input to it from the recording signal processing circuit 107 on the magnetic tape 108.

In the procedure described above, the signals initially input from the interface connector 101 are processed as data, intra-frame compressed picture data, after subjected to data reduction, is formatted into data, and the data can eventually disposed in recording position and recorded in position.

Next, replay operation will be explained below.

When a replay is requested, a replay start command is input to the microprocessor 105 from a switch.(not shown) or a remote controller (not shown). Alternatively, the replay start command is input through the interface 102 from an external device. In response to the replay start command, the microprocessor 105 requests the serve control circuit 112 to start replay operation. The servo control circuit 112 allows the capstan 113 to rotate, and the magnetic tape 108 starts to run. At the same time, the servo control circuit 112 allows the rotary drum 109 to run. Then, the rotary magnetic head 110 on the drum reproduces the signals out of the magnetic tape 108.

The microprocessor 105 sets the reproductive signal processing circuit 111 in a specific mode and allows the circuit 111 to execute reproduction processing for the reproductive signals from the rotary magnetic head 110. The reproductive signal processing circuit 111 performs given demodulation processing for the reproduced signals from the rotary magnetic head 110, converts them into digital data, executes block address detection by ID, and executes error correction by using the inner parity (C1 parity) and the outer parity (C2 parity).

The microprocessor 105 refers to the main header 1201 of the reproduced data of each sync block and allows the circuit 111 to output only the data for a normal replay. Consequently, the circuit 111 does not output the data recorded for a trick-play and sync blocks in which nothing has been recorded. The circuit 111 reproduces 188-byte MPEG packets 1204 from the data for a normal replay written in sync blocks and outputs the MPEG packets to the interface circuit 102 at predetermined timings based on the time information written in the sync blocks.

The microprocessor 105 determines whether the packet data has been reproduced properly, according to information such as the error count of the reproduced blocks. If the packet data has been reproduced properly, the microprocessor 105 commands the reproductive signal processing circuit 111 to output the packet data to the interface circuit 102. In compliance with instructions from the microprocessor, the interface circuit 102 outputs the reproduced packets through the connector 101 to the external device.

Next, rapid reply mode operation will be explained below.

When a trick-play is requested, similarly, a trick-play start command is input to the microprocessor 105 from a switch (not shown), a remote controller (not shown) or the interface. In response to the trick-play start command, the microprocessor 105 requests the serve control circuit 112 to start trick-play operation. The servo control circuit 112 allows the capstan 113 to rotate faster than the rotation speed in normal replay mode, and the magnetic tape 108 starts to run at a higher rate in trick-play mode. At the same time, the servo control circuit 112 allows the rotary drum 109 to run. Then, the rotary magnetic head on the drum reproduces the signals out of the magnetic tape.

The microprocessor 105 sets the reproductive signal processing circuit 111 in trick-play mode and allows the circuit 111 to execute reproduction processing for the reproduced signals from the rotary magnetic head 110. The reproductive signal processing circuit 111 performs given demodulation processing for the reproduced signals from the rotary magnetic head 110, converts them into digital data, executes sync block ID detection, executes error correction by using the inner parity (C1 parity), and reproduces the data written in sync blocks.

The microprocessor 105 refers to the main header 1201 in each sync block and determines whether the reproduced data in the sync blocks is the trick-play data. The data for a normal replay and sync blocks that contain no data are discarded because they are not required for trick-play operation.

The data in sync blocks used for a trick-play is recorded in locations marked 1401 in FIG. 14. However, there is a possibility that the locations falls out of the course of scanning of the rotary magnetic head 110 due to their positions of tracking. Thus, the microprocessor 105 receives the track numbers and sync block numbers of the reproduced sync blocks from the reproductive signal processing circuit 111, checks for tracking deviation, and controls the servo control circuit 112 so that the data in locations 1401 will be reproduced properly.

After the data in locations 1401 is reproduced properly through tracking control, the reproductive signal processing circuit 112 executes error correction by using the inner parity (C1 parity) included in the trick-play data and prepares the trick-play data. The trick-play data is then output through the interface circuit 102 and the connector 101 to the external device.

Although the above description explained the VTR that executes digital signal reception, recording, and replay as an example of embodying the invention, the invention is not limited to such embodiment. The invention is also effective for such a kind of VTR that receives analog picture signals, converts them into digital form, and executes picture data recording.

Figure 16:
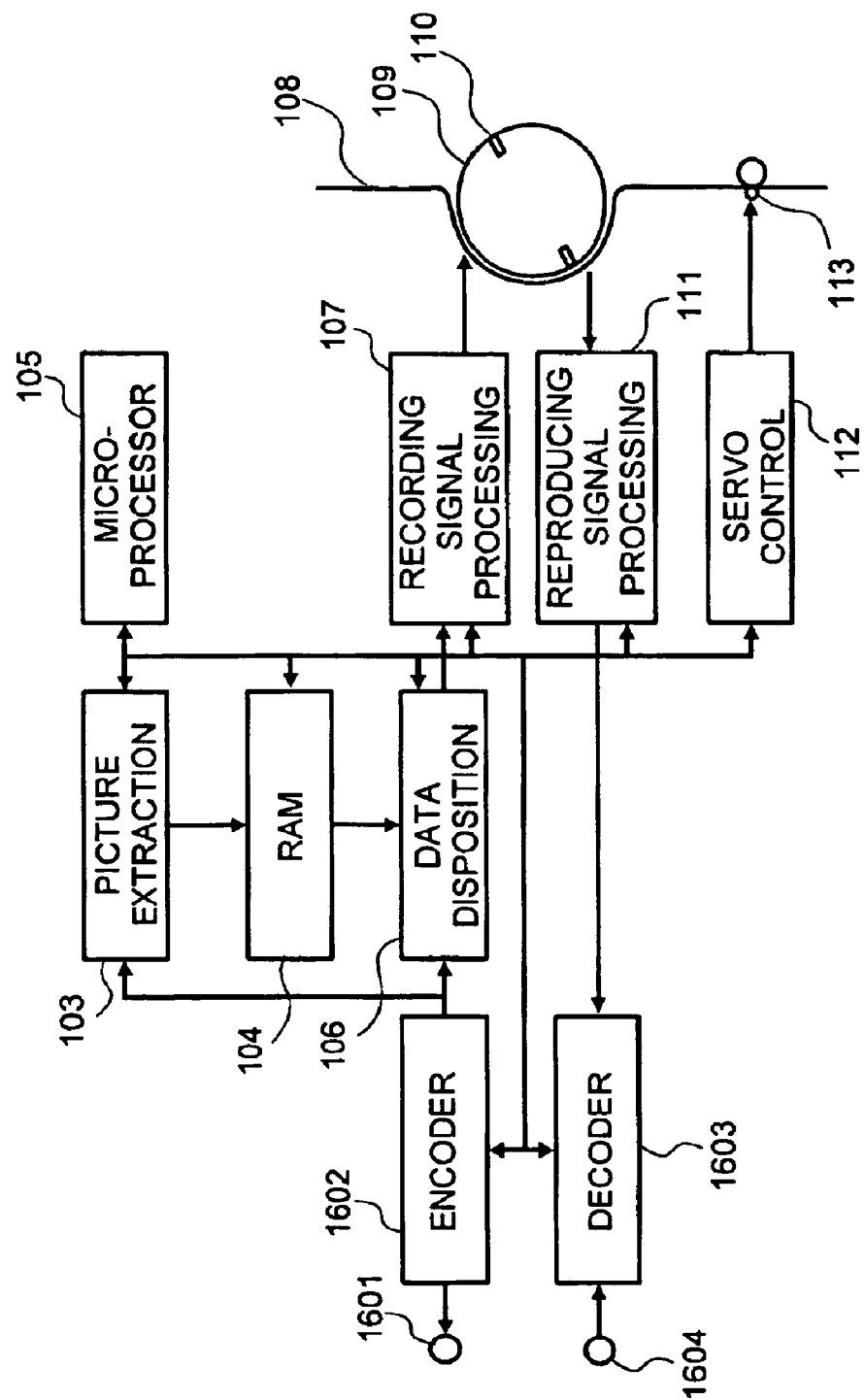
FIG. 16 is the block diagram of a second VTR configuration of the invention.

FIG. 16 shows an example of the VTR that receives analog picture signals, converts them into digital form, and executes picture data recording. Reference numeral 1601 is a picture signal input port at which analog picture signals are input; 1602 is an encoder to encode analog picture signals into digital compressed picture signals; 1603 is a decoder to decode digital compressed picture signals into analog picture signals; 1604 is an picture signal output port from which analog picture signals are output. The components with reference numbers 103 through 11 correspond to those in FIG. 1.

When the VTR shown in FIG. 16 operates to perform recording, the encoder 1602 encodes analog picture signals that have been input to it through the input port 1601 into digital compressed signals. The thus encoded digital compressed picture signals are equivalent to the picture signal packets that are input to the VTR shown in FIG. 1 through the interface connector 101.

The digital compressed picture signals compressed by the encoder are supplied to the picture extraction circuit 104 and the data disposition circuit 106. Subsequent processing is the same as for the VTR shown in FIG. 1; intra-frame coded picture data is extracted from the digital compressed picture signals; the data, after reduced, is disposed in place in sync blocks and recorded on the magnetic tape.

Replay processing is also performed in the same way as for the VTR shown in FIG. 1. Reproduced packets output from the reproductive signal processing circuit 111 are decoded into analog picture signals by the decoder 1603 and output from the output port 1604. In this way, the invention can also be implemented to provide the kind of VTR that receives analog picture signals, converts them into digital form and executes picture data recording.

In the above description of the embodiment of the invention, a case where the VTR reproduces the data for 12-fold speed replays was solely explained. Not limited to this, the application of the method of recording the data that has been reduced beforehand can be implemented for any speed at which a trick-play is achieved. Obviously, this method can be implemented for VTRs operable for trick-plays at a plurality of replay speeds.

By way of example, a VTR operable for trick-plays at two replay speeds will be explained below.

Figure 17:
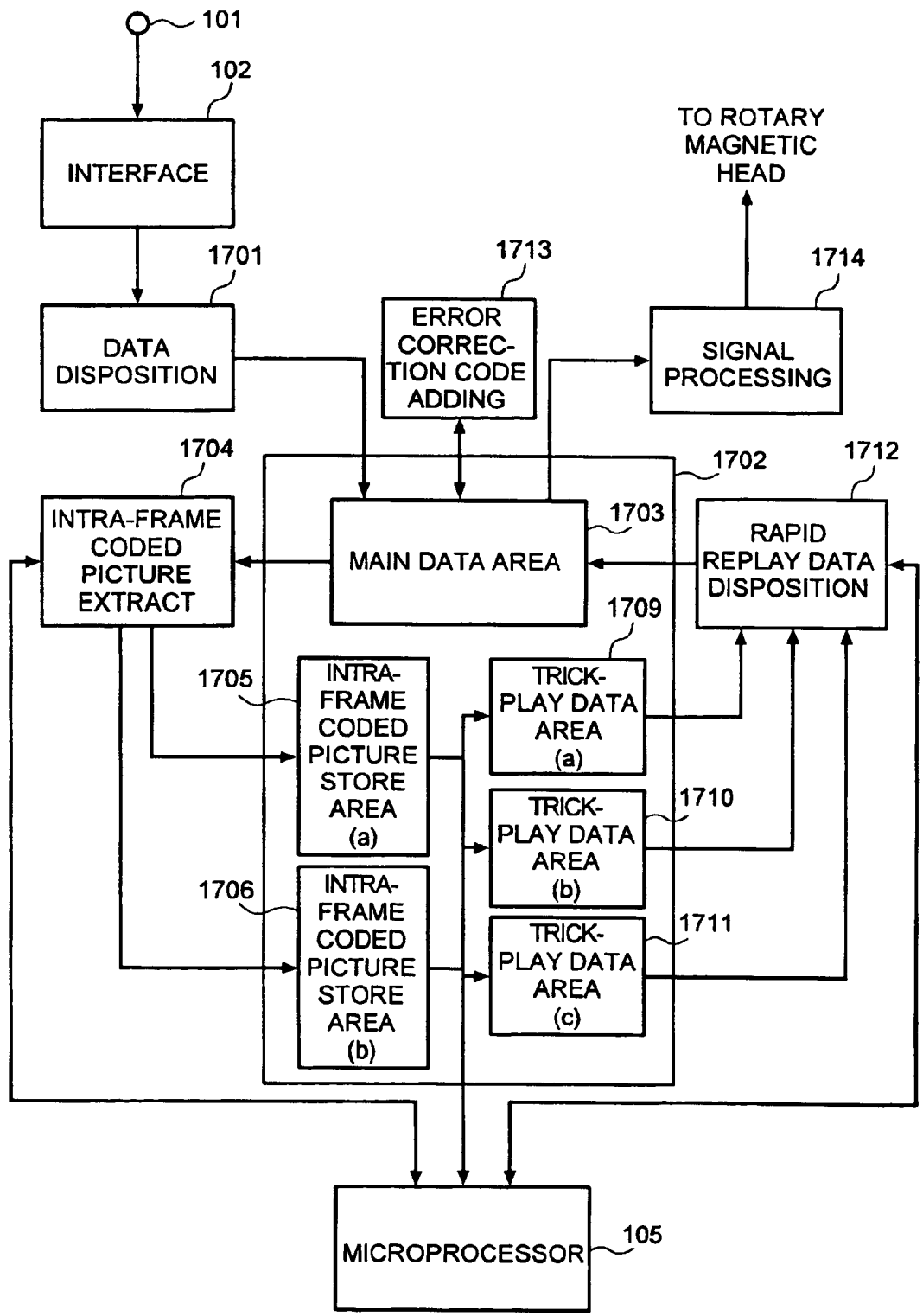
FIG. 17 is the block diagram of a VTR operable for trick-plays at two replay speeds.

FIG. 17 shows the block diagram of a VTR operable for trick-plays at two replay speeds. Reference numeral 101 is an input port; 102 is an interface; 1701 is a data disposition circuit; 1702 is storage unit; 1703 is main data area in the storage 1702; 1704 is an intra-frame coded picture extract circuit; 1705 and 1706 are intra-frame coded picture store areas in the storage 1702; 105 is a microprocessor; 1709, 1710, and 1711 are trick-play data areas in the storage 1702; 1712 is a trick-play data disposition circuit; 1713 is a error correction code adding circuit; and 1714 is a recording signal processing circuit.

Figure 18:
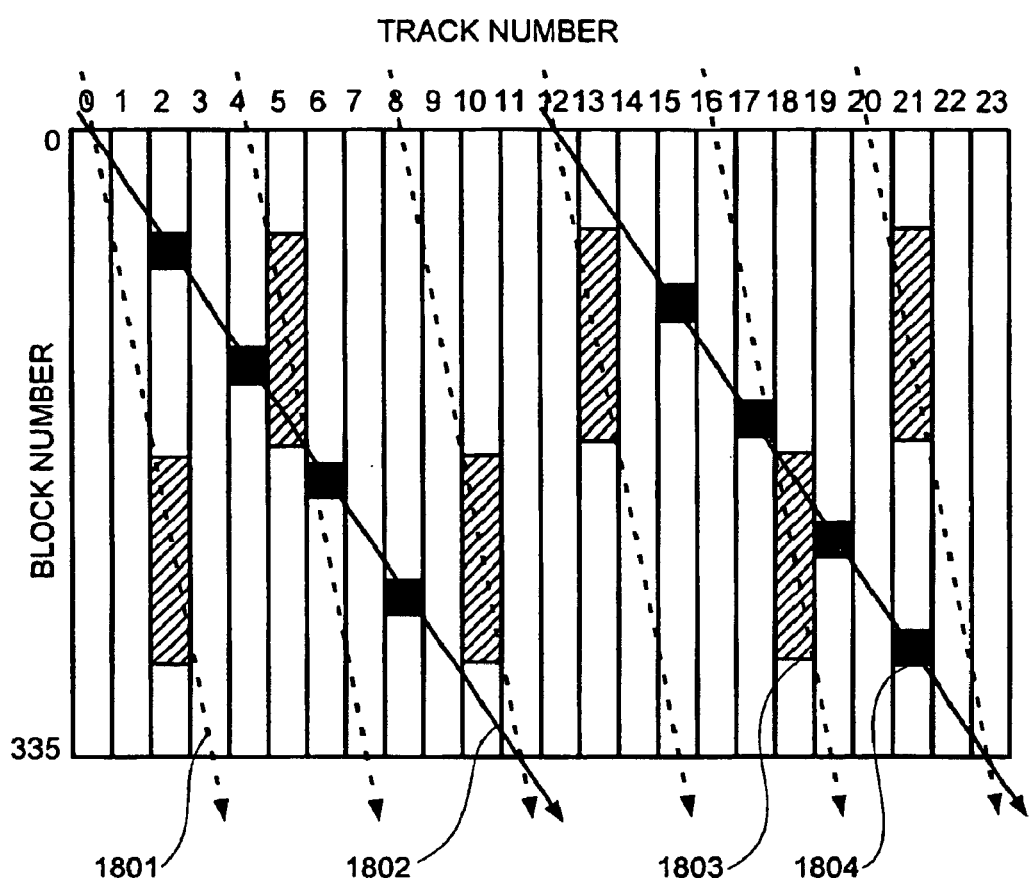
FIG. 18 shows patterns of recording data for trick-plays in 4-fold speed and 12-fold speed modes.

FIG. 18 shows the patterns of recording data for trick-plays in 4-fold speed and 12-fold speed modes. Reference numeral 1801 is the trace of the rotary magnetic head scanning in 4-fold speed replay mode; 1802 is the trace of the rotary magnetic head scanning in 12-fold speed replay mode; 1803 is a 4-fold speed replay data recording field; and 1804 is a 12-fold speed replay data recording field.

Data as much as 112 sub-blocks is reproduced per full rotation of the rotary drum in both 12-fold and 4-fold speed replay modes. When recording data, the data as much as 112 sub-blocks is distributed among 24 tracks and recorded for the 12-fold speed and among 8 tracks for the 4-fold speed. Therefore, the capacity of each 4-fold speed replay data recording field is three times that of each 12-fold speed replay data recording field.

Operation of disposing and recording raid replay data for two replay speeds will be explained below. After packets that have been input through the connector 101 are converted into parallel data by the interface 102, the data disposition circuit 1701 writes the packets into the main data area of the storage. The packets are written into locations other than the 4-fold speed replay data recording fields 1803 and the 12-fold speed replay data recording fields 1804.

The intra-frame coded picture extract circuit 1704 always monitors the packets written into the storage 1703, awaiting the writing of an intra-frame coded picture. Detection of an intra-frame coded picture is performed by detecting a given start pattern as described in the preceding embodiment example. When detecting the writing of an intra-frame coded picture, the intra-frame coded picture extract circuit 1704 copies the detected intra-frame compressed picture from the main data area to the intra-frame coded picture store area (a) 1705. This configuration includes two intra-frame coded picture store areas such that the microcomputer is acting upon one area while data can be rewritten into the other area.

On completing the extraction of an intra-frame coded picture, the intra-frame coded picture extract circuit 1704 reports the completion of intra-frame coded picture extraction to the microprocessor 105. Upon the reception of the report of the completion of intra-frame coded picture extraction, the microprocessor 105 proceeds to the operation of data reduction of the extracted intra-frame coded picture.

The microprocessor 105 first notifies the intra-frame coded picture extract circuit 1704 that it is going to use the intra-frame coded picture store area (a) 1705. In effect, the microprocessor 105 inhibits the intra-frame coded picture extract circuit 1704 from using the intra-frame coded picture store area (a) 1705 and forces the circuit 1704 to use the intra-frame coded picture store area (b) 1706.

Then, the microprocessor 105 commands the intra-frame coded picture extract circuit 1704 to start to extract another intra-frame coded picture. This assures that an incoming intra-frame coded picture is stored without being missed while the microprocessor 105 executes the operation of data reduction for the extracted intra-frame coded picture. Next time the intra-frame coded picture extract circuit 1704 detects an intra-frame coded picture, it copies the picture to the intra-frame coded picture store area (b) 1706.

The microprocessor 105 executes data reduction for the intra-frame coded picture that has been stored into the intra-frame coded picture store area (a) 1705. Specifically, the microprocessor 105 reads the data from the intra-frame coded picture store area (a) 1705 and cuts the DCT-transformed high-band spatial frequency components, thus reducing the data quantity, in the same manner as explained for the embodiment shown in FIG. 1. The microprocessor 105 writes the intra-frame coded picture data whose quantity has been reduced into the trick-play data area (a) 1709.

This configuration includes three trick-play data areas 1709, 1710, and 1711, enabling the simultaneous execution of three operations: disposing 4-fold speed replay data, disposing 12-fold speed replay data, and writing from the microcomputer. Each trick-play data is disposed such that 112 sub-blocks of data can be reproduced per full rotation of the rotary drum during a trick-play.

In the trace of the rotary magnetic head scanning in 12-fold speed replay mode, marked 1802 in FIG. 18, the data in eight trick-play data fields 1804 is reproduced per full rotation of the rotary drum. Thus, 14 sub-blocks of data shall be recorded in each trick-play data field 1804. In the trace of the rotary magnetic head scanning in 4-fold speed replay mode 1801, on the other hand, the data in two trick-play data fields 1803 is reproduced per full rotation of the rotary drum. Thus, 52 sub-blocks of data must be recorded in each trick-play data field 1803.

The data recording capacity of each 4-fold speed replay data recording field 1803 is three times that of each 12-fold speed replay data recording field 1804. Thus, data recording should be executed such that the quantity of data to be disposed in each 4-fold speed replay data recording field 1803 will be three times that to be disposed in each 12-fold speed replay data recording field 1804.

Figure 19:
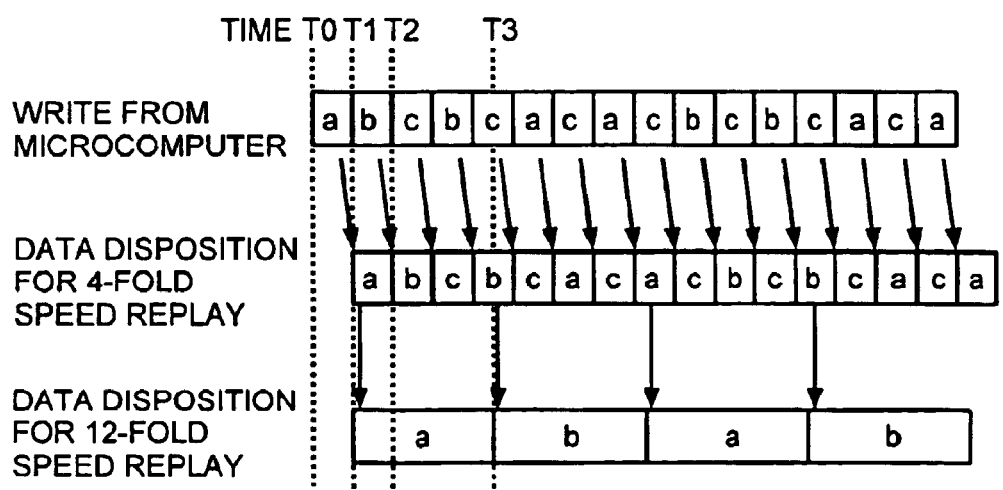
FIG. 19 shows timings of access to the trick-play data areas.

FIG. 19 shows timings of access to the trick-play data areas; where a represents the access to the trick-play data area (a) 1709, b represents the access to the trick-play data area (b) 1710, and c represents the access to the trick-play data area (c) 1711.

At time T0, the microprocessor 105 first writes an intra-frame compressed picture data whose quantity has been reduced into the trick-play data area (a) 1709. When writing the picture data is completed (T1), the trick-play data disposition circuit 1712 reads the data from the trick-play data area (a) 1709 to dispose both 4-fold speed replay data and 12-fold speed replay data of the picture. While the trick-play data disposition circuit 1712 executes data disposition, the microprocessor 105 writes the next intra-frame compressed picture data into the trick-play data area (b) 1710 that is not being accessed by the circuit 1712.

Time taken for the trick-play data disposition circuit 1712 to complete disposing 4-fold speed replay data is one-third the time to complete disposing 12-fold speed replay data. Upon the completion of disposing all data from the trick-play data area (a) 1709 as the 4-fold speed replay data (T2), the trick-play data disposition circuit 1712 starts to read new data from the trick-play data area (b) and dispose it in predetermined locations. At this time, the trick-play data disposition circuit 1712 has not yet completed disposing the 12-fold speed replay data of the picture and continues to read the data from the trick-play data area (a) 1709 to dispose it as the 12-fold speed replay data.

Then, the microprocessor 105 writes another intra-frame compressed data into the trick-play data area (c) 1711. This is because the trick-play data area (a) 1709 is being accessed for disposing 12-fold speed replay data and the trick-play data area (b) 1710 is being accessed for disposing 4-fold speed replay data. In this way, data writing from the microprocessor 105 is performed to the area not being accessed for disposing both 4-fold speed and 12-fold speed replay data.

Upon the completion of disposing the 12-fold speed replay data of the picture (T3), the trick-play data disposition circuit 1712 reuses the data that is currently used as the 4-fold speed replay data of the next picture as the 12-fold speed replay data of the next picture. At time T3, specifically, the trick-play data disposition circuit 1712 accesses the trick-play data area (b) 1710 and reads the data written into this area, the data was once read and disposed as the 4-fold speed replay data, to dispose the 12-fold speed replay data.

To the trick-play data disposed on the main data area 1703 by the trick-play data disposition circuit 1712, the error correction code adding circuit 1713 adds the error correction code shown in FIG. 13. In addition, the circuit 1713 adds double error correction codes shown in FIG. 15 to all data to which trick-play data is added in the main data area. After demodulated through the recording signal processing circuit 1714, the main data is recorded on magnetic tape by the rotary magnetic head (not shown). These processing actions are the same as for the VTR shown in FIG. 1.

By the processing described above, trick-play data can be disposed in predetermined locations and recorded so as to be suitable for being reproduced at two different replay speeds. Although the above description explains the VTR operable for 4-fold and 12-fold speed replays as an example, the invention can be embodied, not limited to this. The invention makes it possible to record data for trick-plays in locations suitable for being reproduced at any number of replay speeds.

Next, the method of recording compressed picture data on magnetic tape, enabling rapid picture replays in both fast forward and rewind modes will be explained below.

Trick-plays are performed in either fast forward mode or rewind mode and it is desirable that pictures can be reproduced in both modes. Because the magnetic tape run direction for fast forward is opposite to that for rewind, the data locations on magnetic tape that the rotary magnetic head scans in fast forward mode differs from those in rewind mode.

Figure 20:
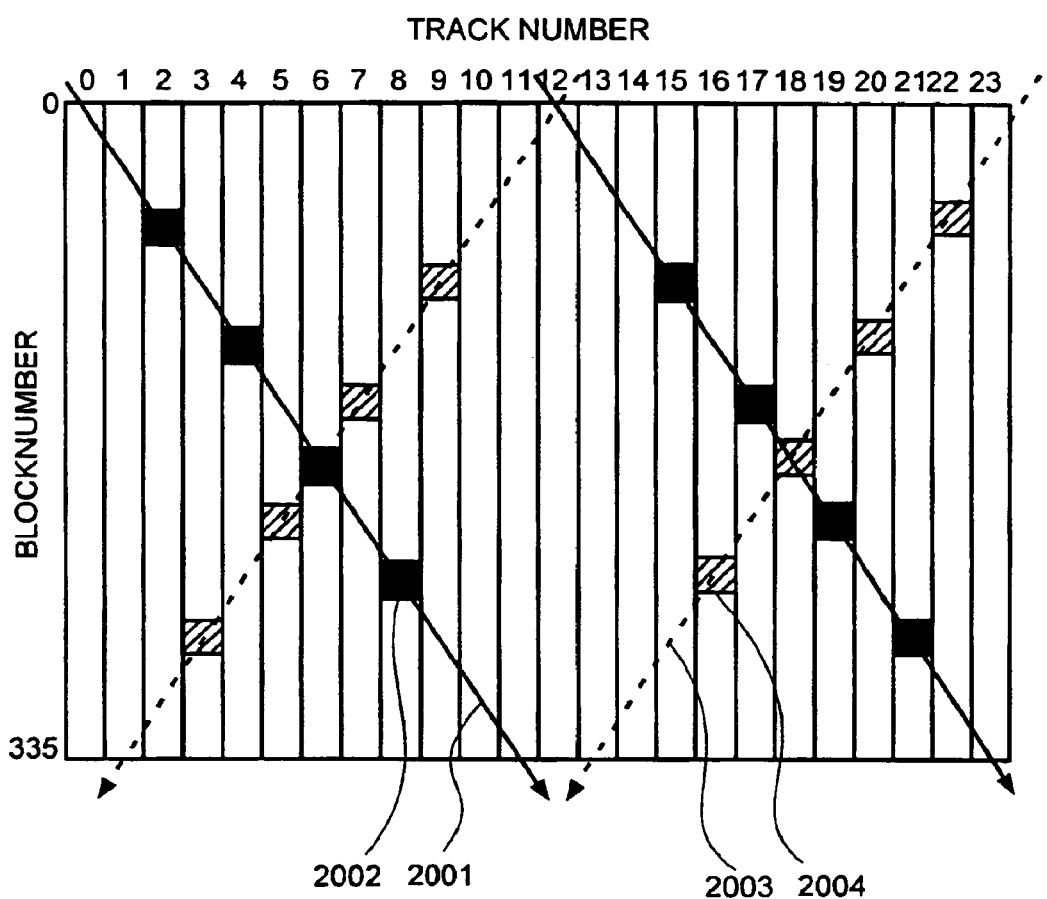
FIG. 20 shows the traces of rotary magnetic head in fast forward and rewind modes.

FIG. 20 shows the traces of the rotary magnetic head in fast forward and rewind modes.

In FIG. 20: reference numeral 2001 is the trace of the rotary magnetic head scanning in fast forward mode; 2003 is the trace of the rotary magnetic head scanning in rewind mode; 2002 is picture data to be reproduced in fast forward mode; and 2004 is picture data to be reproduced in rewind mode.

When fast forward is performed, the magnetic tape runs fast in the forward direction and the trace of the rotary magnetic head is as indicated by the solid lines 2001. When rewind is performed, the magnetic tape runs in the opposite direction to the direction in which the tape runs for a replay and the trace of the rotary magnetic head is as indicated by the dotted lines 2003.

To enable reproducing pictures in both fast forward and rewind modes, it is necessary to record picture data in locations 2002 and 2004. Because the locations on magnetic tape that the rotary magnetic head scans in fast forward mode differs those in rewind mode, the fast forward trick-play data and the rewind trick-play data must be recorded separately.

Moreover, the sequence of reproducing data in rewind mode is reverse, but the data must be output in normal order to reproduce pictures. Although a method of rearranging the sequence of data reproduced during rewind before outputting the data may be used, reproductive signal processing is complex in this method. Thus, it is desirable to record data for rewind and replay while rearranging the data sequence in advance.

Figure 21:
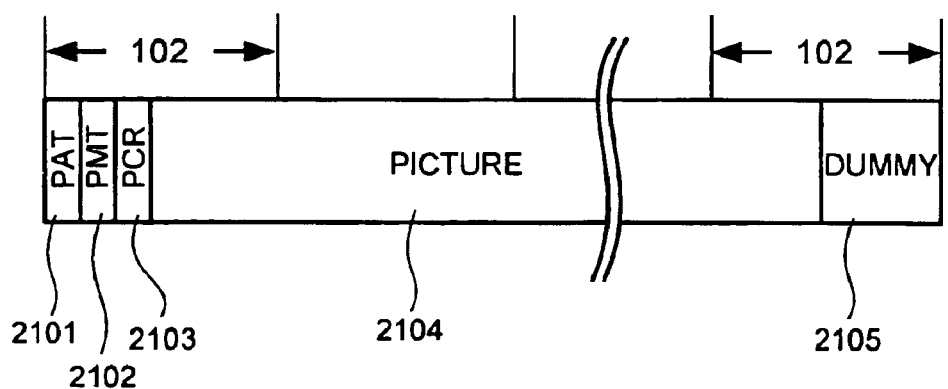
FIG. 21 is the structure of trick-play data.

FIG. 21 shows data structures of recording data.

In FIG. 21: reference numeral 2101 is PAT; 2102 is PMT; 2103 is PCR; 2104 is picture data; and 2105 is dummy data.

Packets of picture data generated through data reduction processing of the microprocessor 105 are stored into RAM 104. PAT, PMT, and PCR packets head each picture data such that the picture data can be promptly reproduced during a replay. This assures that, whenever picture data in any location is reproduced, its PID can be detected, according to PAT and PMT, and picture data can be decoded. Recording PCR as well assures that the decoder can be notified of accurate time information.

The trick-play data is recorded in units of data that can be reproduced by trick-play per full rotation of the rotary magnetic head. Specifically, as shown in FIG. 13, 102 blocks of data are put together, error correction code is added, and disposed on magnetic tape.

However, the size of picture data generated through data reduction processing of the microprocessor 105 including PAT, PMT, and PCR does not always meet a multiple of 102 blocks. Remaining blocks after the picture data is divided into units of 102 blocks shall contain nothing.

Although following picture data can be put in these remaining blocks, the remaining blocks should remain as is because rewind trick-play data is recorded in sequence reverse to the sequence of fast forward trick-play data and recorded picture data is also reproduced in reverse order in rewind trick-play mode, which may result in trouble in smooth trick-play operation.

In remaining blocks, a dummy block flag is set to indicate that the block contains no data or values not affecting the trick-play operation (e.g., all 0s) are recorded as data. Alternatively, the remaining blocks are padded, for example, by recording packets with the PID of a hexadecimal value of 1FFF indicating a dummy packet in the blocks.

The data disposition circuit 106 disposes the above-mentioned packets stored into the RAM 104 in block locations falling in line with the trace of the rotary magnetic head in fast forward trick-play mode and block locations falling in line with the trace in rewind trick-play mode.

Figure 22:
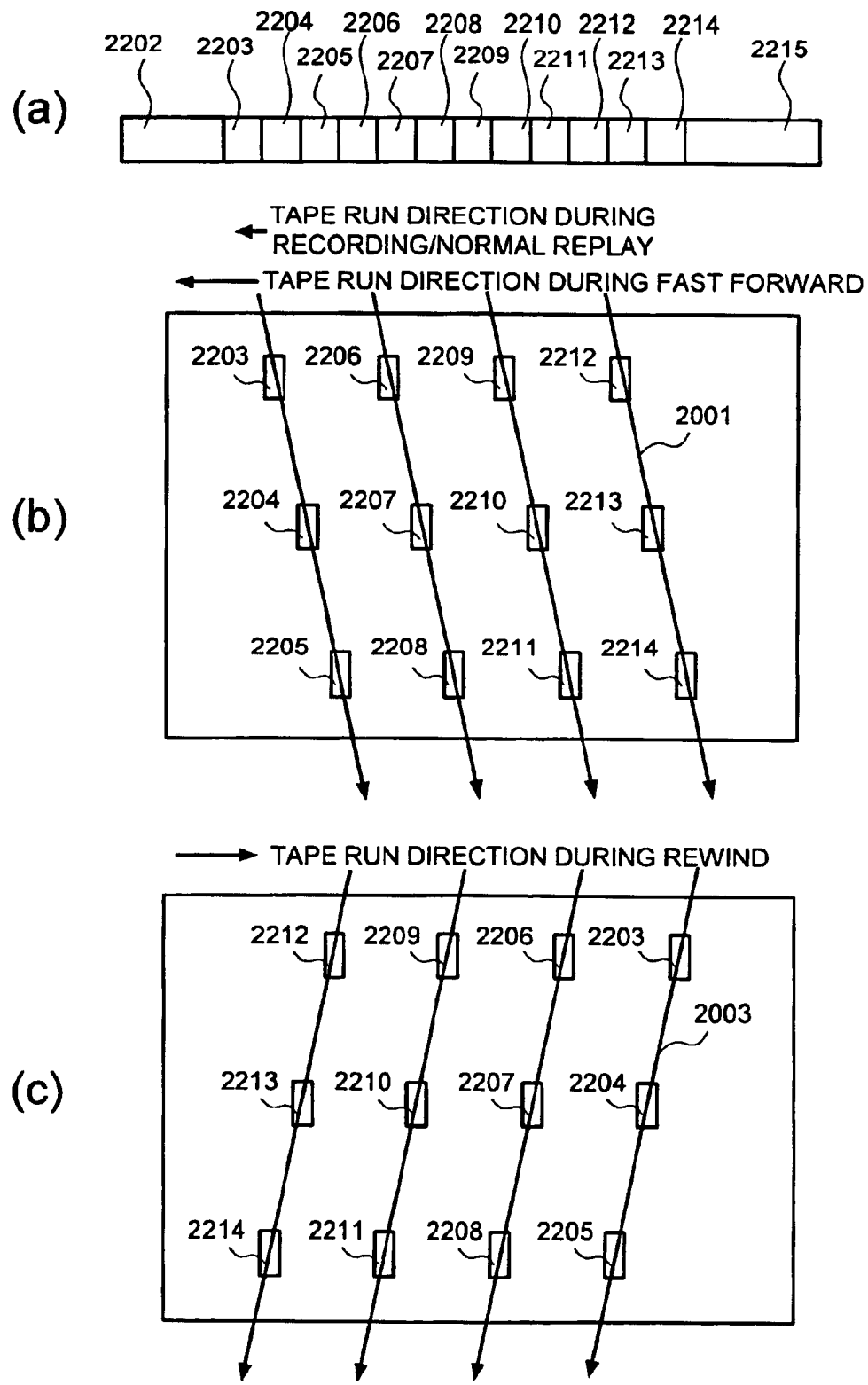
FIG. 22($a$) through ($c$) show the data locations for fast forward and rewind.

FIG. 22 shows relation between the data locations for fast forward and the data locations for rewind.

In FIG. 22: reference numeral 2200 is the trace of the rotary magnetic head in fast forward mode; 2201 is the trace of the rotary magnetic head in rewind mode; 2202 is picture data that has been displaced; 2203 though 2214 are picture data that are being read to be displaced; and 2215 is following picture data.

The picture data comprising data 2203 through 2214 corresponds to the picture data shown in FIG. 21. Data 2203 includes above-mentioned PAT, PMT, and PCR data. The last data 2214 includes dummy blocks. If, however, the generated packet data size is a multiple of 102, the data 2213 does not include dummy blocks. 10-word error correction code is added per 102 blocks.

In fast forward mode, magnetic tape runs fast in the same direction as the direction in which data is recorded. Thus, fast forward replay data shall simply be disposed and recorded in order from the first data 2201 of the picture data packet up to 2212.

In rewind mode, on the other hand, the magnetic tape runs in the opposite direction to the direction in which data is recorded. To allow picture data to be reproduced in normal sequence, displace and record the picture data in reverse order from data 2212 to 2201.

Even if some blocks of data 2212 remains blank when data is generated, the blocks are filled with dummy data instead of recording subsequent data 2213 there as noted above. This is because the data 2213 must be reproduced, preceding the data 2201 when a rewind and replay is performed.

By the processing described above, the data, as shown in FIG. 21, can be displaced so as to be reproduced appropriately in either fast forward or rewind mode and the data will be reproduced properly without reversing the sequence of reproducing data even when a rewind trick-play is performed.

By the way, the sequence of reproducing the pictures in rewind mode is reverse to that in fast forward mode. As a result, the time of displaying each of the pictures in rewind mode differs from that is fast forward mode. Thus, it is necessary to set and record time information added to each picture, according to the replay time suitable for each mode. This time information means PCR, PTS, and DTS.

It is possible to store picture data for fast forward and picture data for rewind into different areas in the storage and rewrite only the time information, but this wastes storage space and requires additional processing time. Same picture data can be used as picture data for fast forward and picture data for rewind, but only the time information differs, so it is satisfactory to rewrite only the data portion in which time information is stored.

Because the data for fast forward is disposed in order from 2202, the 2202 block including time information is first read and disposed among the picture data from 2202 to 2213. On the other hand, the data for rewind is disposed in reverse order from 2212, and consequently the 2201 block including packets into which time information is stored is disposed last of all.

Therefore, after the data in the 2201 block including time information is used for disposing the data for fast forward, time passes as the tape moves by several tens of tracks before the same data is used for disposing the data for rewind. The time information can be updated, not requiring wasteful storage space, in such a manner that it is first stored in the storage as the time information for fast forward and replay use and then replaced with the time information for rewind use after the 2201 data disposition is completed.

The time information for fast forward increases in proportion to the number of tracks T by which the tape moves from the recording location of the time information included in the preceding picture data 2202 to the recording location of the time information included in the 2203 block. The time information on, for example, picture data for a 12-fold speed replay should increase by time that passes as the tape moves by T/12 tracks. On the other hand, the time information included in the picture data for rewind should decrease by time that passes as the tape moves by T/12 tracks.

By the processing described above, the time information on the picture data to suit both fast forward and rewind operations can be recorded properly. Of course, the data can be disposed to suit both fast forward and rewind operations, according to the track patterns suitable for being reproduced at two different trick-play speeds described above.

The above recording apparatus and a recording medium on which picture data has been recorded by the recording apparatus have the advantage that picture data is reduced in advance and recorded separately for a trick-play, and consequently the number of picture pages to be reproduced during the trick-play increases, enabling rapid display update on screen. Because picture data reduction processing is executed through program processing of an microprocessor, the size of circuit configuration can be greatly reduced as compared with a configuration including only signal processing circuits to execute the corresponding processing and easy accommodation to different broadcast types of picture data is possible. Furthermore, the invention enables trick-plays at different trick-play speeds and for fast forward and rewind operations and provides a multifunctional and easy-to-use recording apparatus and a recording medium.

The invention may be embodied in other specific forms without departing from the spirit or essential characteristics thereof. The present embodiment is therefore to be considered in all respects as illustrative and not restrictive, the scope of the invention being indicated by the appended claims rather than by the forgoing description and all changes which,come within the meaning and range of equivalency of the claims are therefore intended to be embraced therein.

We claim:

1. A digital signal recording apparatus for recording a digital compressed picture signal by using a rotary magnetic head in contact with running magnetic tape, comprising:

a picture data extraction circuit for extracting picture data out of an input digital compressed picture signal;

a trick-play-data generation means for generating trick-play-data from said picture data;

a data disposition circuit for disposing said trick-play data on tracks in position falling in line with a trace of said rotary magnetic head scanning in a trick-play mode; and a storage unit for storing the picture data extracted by said picture data extraction circuit and the trick-play data that is disposed by said data disposition circuit, wherein:

said data disposition circuit disposes data for fast forward trick-play on tracks in predetermined fast-forward data recording locations falling in line with a trace of said rotary magnetic head scanning in a fast forward mode and data for rewind trick-play on tracks in predetermined, rewind data recording locations falling in line with a trace of said rotary magnetic head scanning in a rewind mode, and said trick-play-data generation means generates said data for fast forward trick-play and said data for rewind trick-play on the basis of same picture information and different time information.

2. The digital signal recording apparatus according to claim 1, wherein time information for said data for fast forward trick-play is replaced with time information for said data for rewind trick-play in said storage unit after said trick-play-data generation means reads the former time information from said storage unit and sends it to said data disposition circuit and before sending the latter time information to said disposition circuit.

3. A recording medium on which a digital signal recording apparatus having a rotary magnetic head records a digital compressed picture signal, the recording medium comprising;

data for fast forward trick-play disposed and recorded thereon in a predetermined fast-forward data recording location falling in line with a trace of said rotary magnetic head scanning in a fast forward mode, data for rewind trick-play disposed and recorded thereon in a predetermined rewind data recording location falling in line with a trace of said rotary magnetic head scanning in a rewind mode, wherein said data for fast forward trick-play and said data for rewind trick-play generated on the basis of same picture information and different time information are recorded thereon.

\* \* \* \* \*